(No Model.)  7 Sheets—Sheet 1.

A. M. ENGLISH.
BUTTON SETTING MACHINE.

No. 390,214.  Patented Oct. 2, 1888.

WITNESSES.
Albert E. Leech.
M. H. Thompson.

INVENTOR
Arnaldo M. English
By his Attorney.

(No Model.) 7 Sheets—Sheet 2.

A. M. ENGLISH.
BUTTON SETTING MACHINE.

No. 390,214. Patented Oct. 2, 1888.

WITNESSES
Albert E. Leach
M. H. Thompson

INVENTOR
Arnaldo M. English
By his Attorney
Wm B. H. Dowse (No Model.) 7 Sheets—Sheet 3.

A. M. ENGLISH.
BUTTON SETTING MACHINE.

No. 390,214. Patented Oct. 2, 1888.

WITNESSES
Albert E. Leach
M. H. Thompson.

INVENTOR
Osaldo M English
By his Attorney (No Model.) 7 Sheets—Sheet 4.

A. M. ENGLISH.
BUTTON SETTING MACHINE.

No. 390,214. Patented Oct. 2, 1888.

WITNESSES
Albert E. Leach
M. H. Thompson

INVENTOR
Arnoldo M. English
By his Attorney.

(No Model.) 7 Sheets—Sheet 5.
A. M. ENGLISH.
BUTTON SETTING MACHINE.
No. 390,214. Patented Oct. 2, 1888.
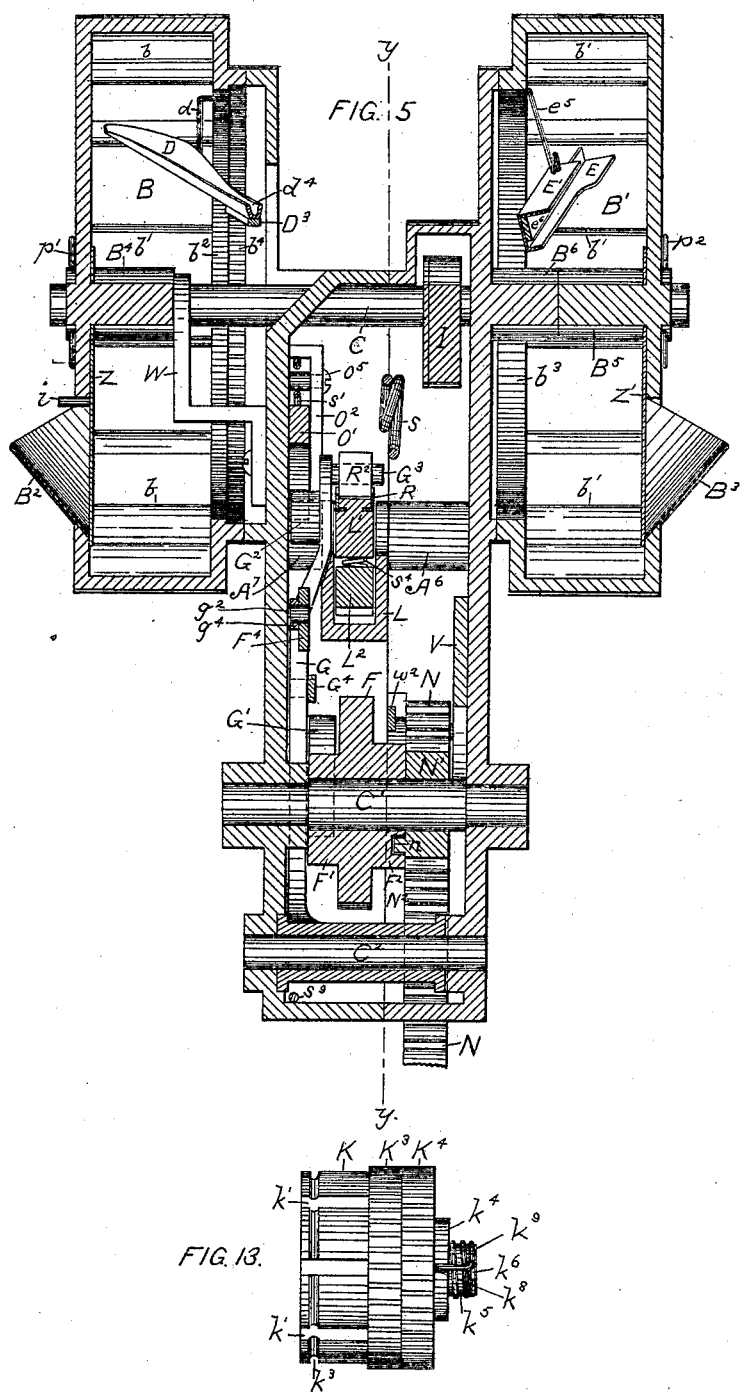

(No Model.) 7 Sheets—Sheet 6.

A. M. ENGLISH.
BUTTON SETTING MACHINE.

No. 390,214. Patented Oct. 2, 1888.

WITNESSES.
Albert E. Leach
M. H. Thompson

INVENTOR
Arnaldo M. English
By his Attorney.

(No Model.) 7 Sheets—Sheet 7.

A. M. ENGLISH.
BUTTON SETTING MACHINE.

No. 390,214. Patented Oct. 2, 1888.

WITNESSES
Albert E. Leech
M. H. Thompson

INVENTOR
Arnold M. English
By his Attorney
W. B. H. Dowse

United States Patent Office.

ANALDO M. ENGLISH, OF BOSTON, MASSACHUSETTS, ASSIGNOR TO THE PRATT MANUFACTURING COMPANY, OF PORTLAND, MAINE.

BUTTON-SETTING MACHINE.

SPECIFICATION forming part of Letters Patent No. 390,214, dated October 2, 1888.

Application filed April 18, 1888. Serial No. 271,043. (No model.)

*To all whom it may concern:*

Be it known that I, ANALDO M. ENGLISH, a citizen of the United States, residing at Boston, in the county of Suffolk and Commonwealth of Massachusetts, have invented a certain new and useful Button Setting Machine, of which the following is a complete specification.

My invention consists of an improved machine for securing buttons by metallic fasteners to leather, cloth, and other articles, both the buttons and fasteners being fed automatically to the machine, as hereinafter described.

Figure 1:
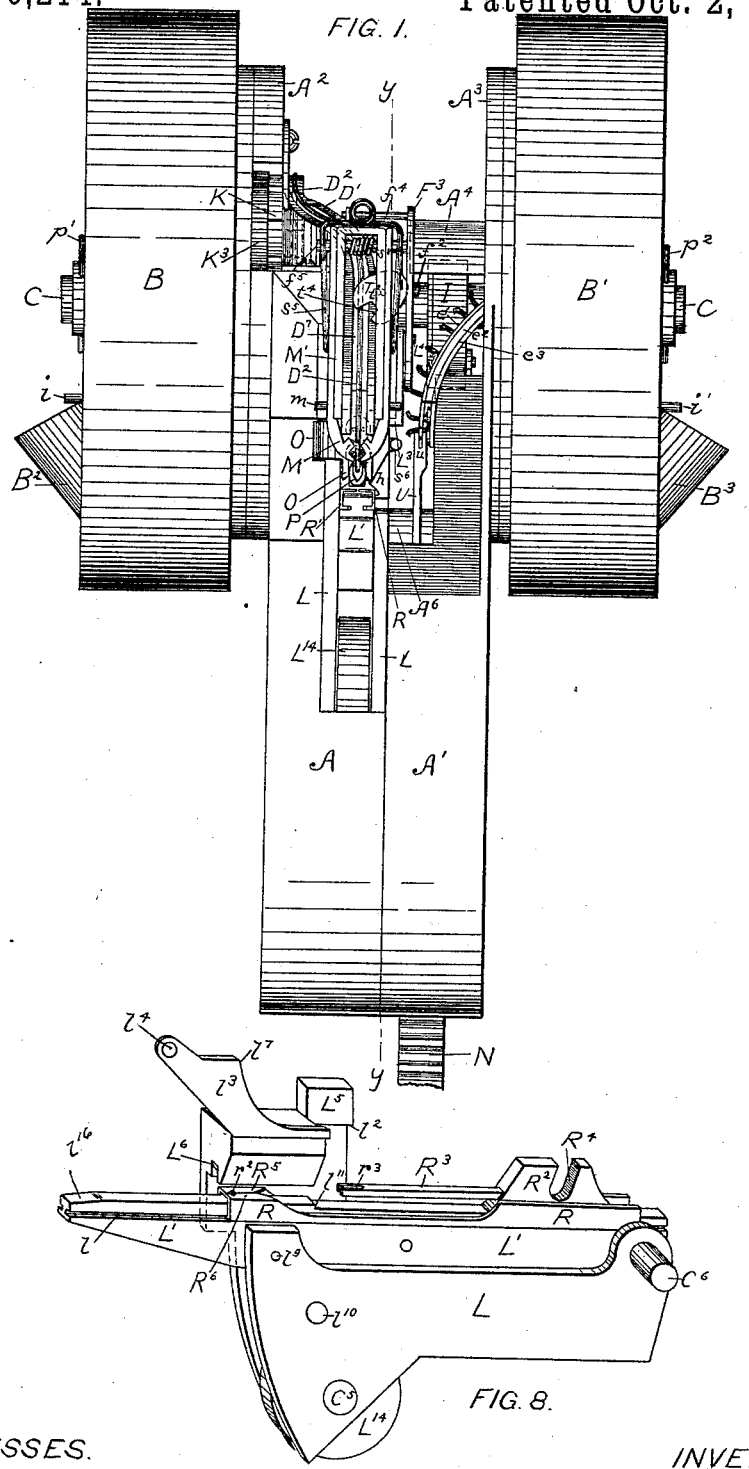
Figure 2:
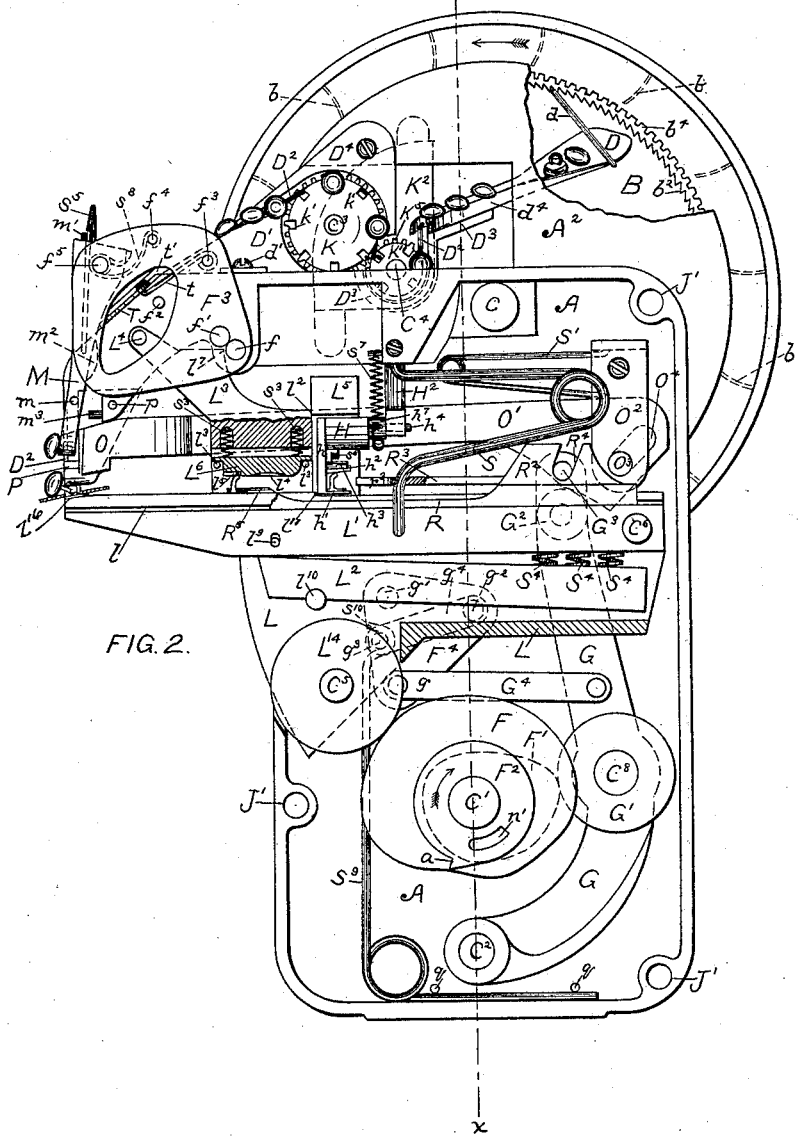
Figure 9:
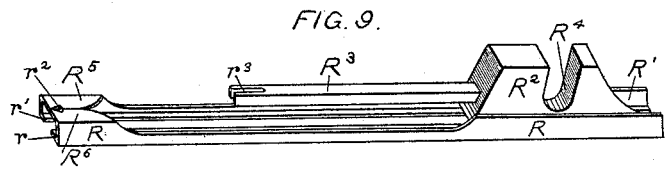
Figure 3:
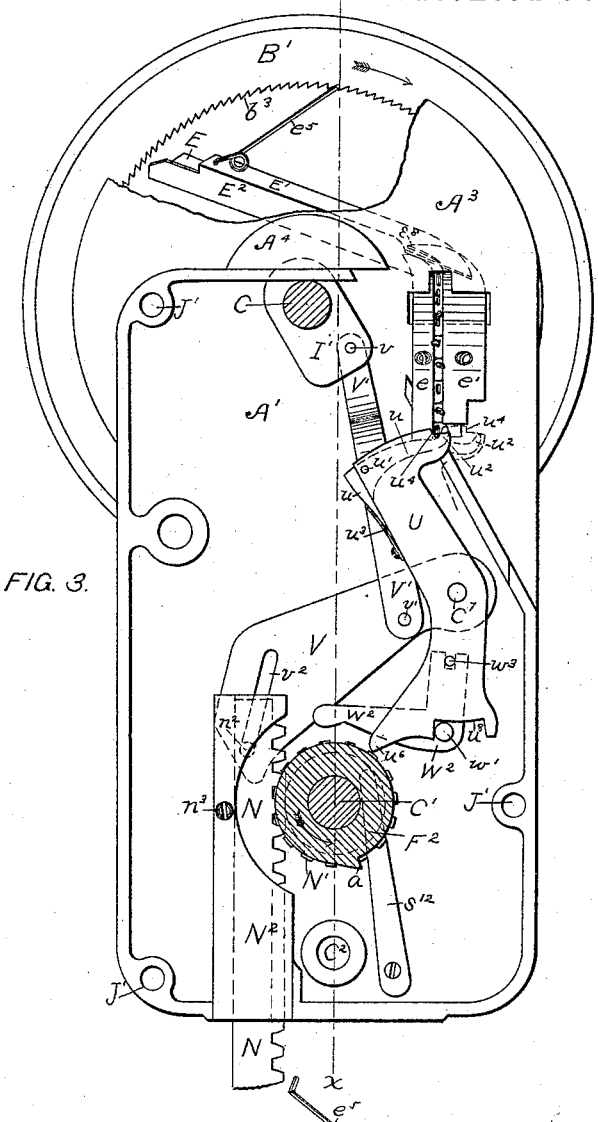
Figure 10:
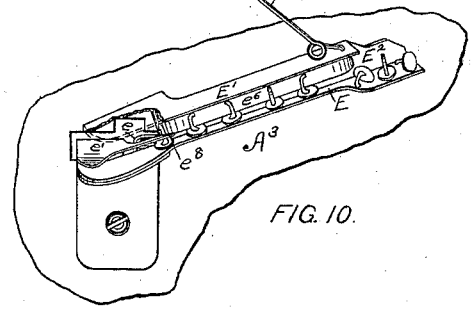
Figures 4, 11, 12:
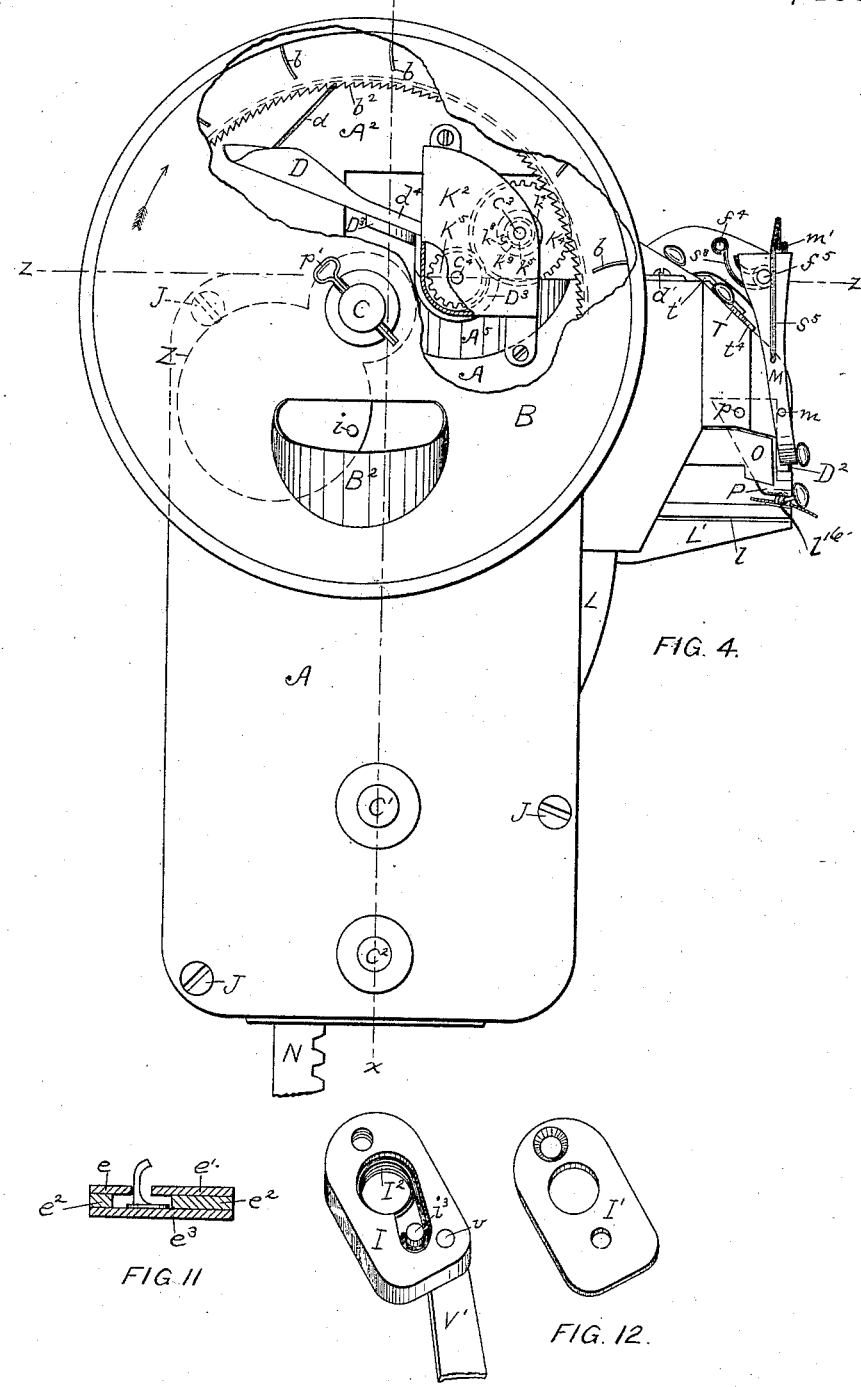
Figure 6:
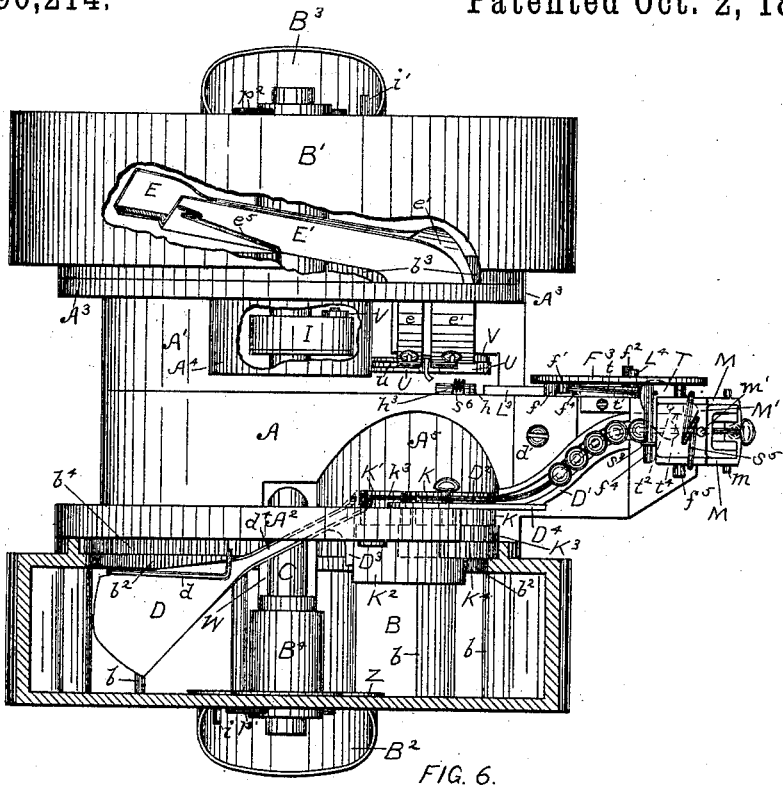
Figure 14:
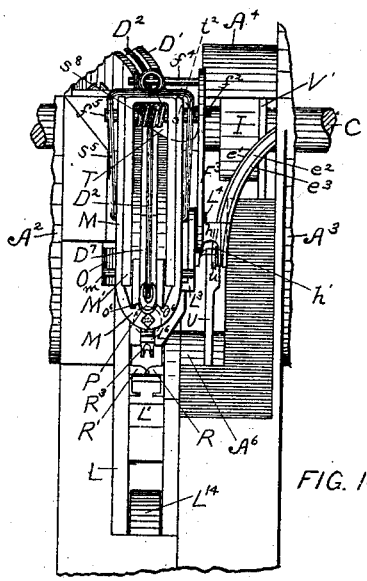
Figure 15:
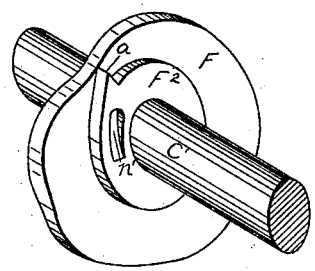
Figure 7:
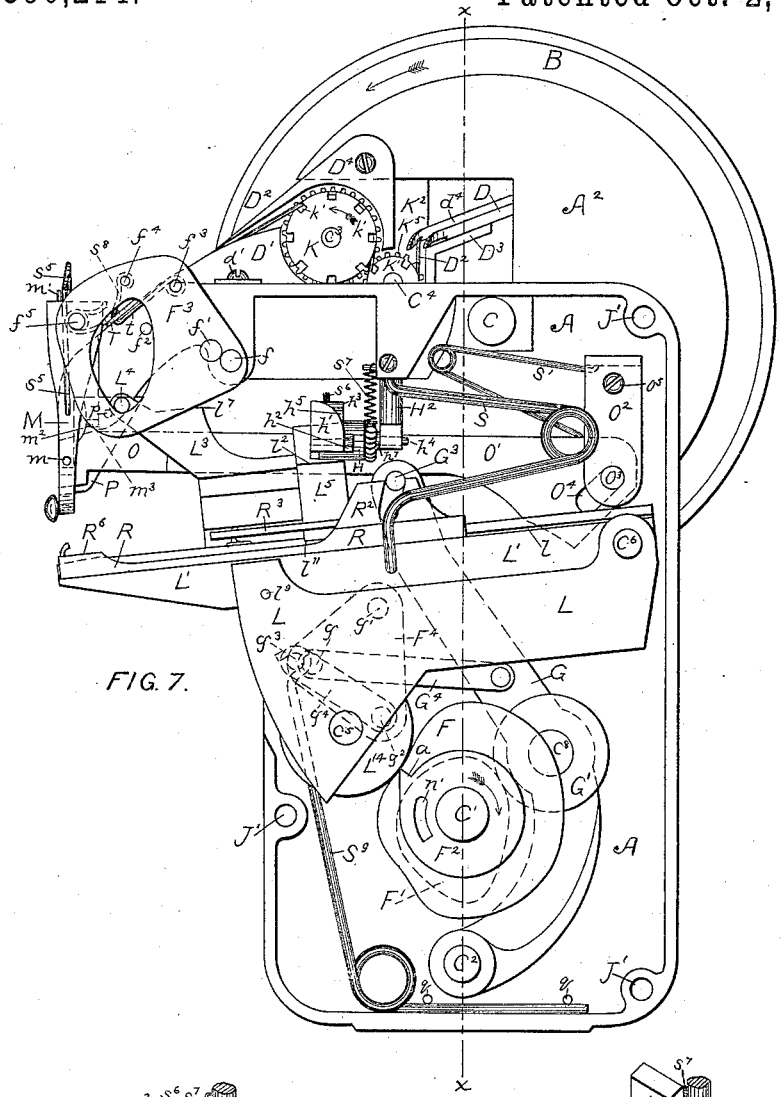
Figure 16:
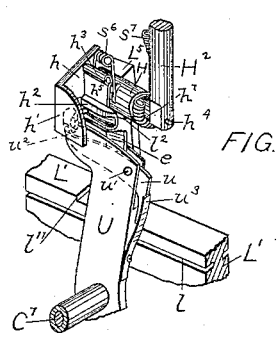
Figure 17:
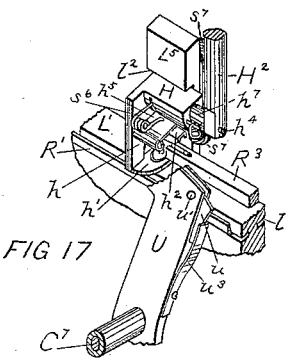

In the accompanying drawings, Figure 1 represents a front elevation of the complete machine. Fig. 2 is a view looking into one of the two portions of which the case is composed, showing the working parts inclosed therein, the other portion of the case being removed. Fig. 3 is a view looking into the other portion of the case, the section being taken on $yy$, Fig. 1. Fig. 4 is a side elevation, partly broken away to show certain internal parts. Fig. 5 is a section on $xx$, Figs. 2, 3, and 4. Fig. 6 is a plan view, partly in section; Fig. 7, a similar view to Fig. 2, but at a different stage of the operation. Fig. 8 is a perspective view of the cradle and its attachments. Fig. 9 represents the sliding fastener-carrier and adjacent parts. Fig. 10 shows in detail a portion of the fastener-feed. Fig. 11 is a section of the fastener-raceway on a larger scale, showing a fastener therein. Fig. 12 shows the friction-clutch. Fig. 13 is a front view of one of the grooved guide-rollers and the two pinions on the same axis therewith. Fig. 14 is a partial front view of the machine with parts in the same position as in Fig. 7. Fig. 15 is a perspective view of the cams; and Figs. 16 and 17 show in perspective the hinged carrier, pivoted lever, and parts of the cradle at opposite stages of the operation of transferring the fastener from the raceway to the cradle.

The working parts of the machine are for the most part inclosed in a case consisting of two portions, A and A', secured together in any desired manner, as by screw-bolts J J J, fitting into the holes J' J' J'. A reciprocating up-and-down motion is given to the rack N, from which motion is transmitted to all parts of the machine. To this end the case A A' may be screwed or otherwise attached to an ordinary treadle-base, the rack N being secured to the top of the upright rod connecting with the treadle; but reciprocating motion may be given the said rack in any other desired manner.

The rack N is provided near its upper end with a pin, $n^2$, Fig. 3, which engages in a slot, $v^2$, in one end of a lever, V, pivoted at $C^7$.

V' is a connecting-bar pivoted at one end to the lever V and at the other to the friction-clutch I, by means of which an intermittent rotary motion is given to the spindle C, on which the drums B B' are fixed. This clutch (shown in detail in Fig. 12) consists, principally, of a wire, $I^2$, bent into a coil of sufficient size to inclose the spindle C, and secured at one end around a post, $i^3$, the wire being inclosed in a case having a cover, I', secured thereto. During the motion of the clutch in one direction the coil $I^2$ tightly closes around the spindle C, which it turns through the same arc as the clutch itself. During the motion of the clutch in the opposite direction the coil $I^2$ slips over the spindle C, which is prevented from turning, except in the direction indicated by the arrow, by means hereinafter described. The clutch thus acts as a pawl and ratchet in giving intermittent motion to the shaft. The position of the slot $v^2$ is such that the motion transmitted from the rack N through the lever V and the connecting-bar V' to the clutch I is considerably reduced.

All the working parts inclosed in the case A A' derive their various motions from the three cams F F' F², mounted on the spindle C', and made preferably in one piece, as shown in Fig. 5. From the pinion N', which turns loosely on the spindle C' and engages with the rack N, an intermittent rotary motion is imparted to the said cams as follows: At each downstroke of the rack N the pinion turns one revolution in one direction, turning back again during the upstroke. At the beginning of the downstroke of the rack the pin or tooth $n$, Fig. 5, on the face of the pinion N' nearest the cam $F^2$, engages with the slot $n'$ on the face of said cam, the shape of which slot, as best shown in Fig. 15, is such that when the pinion is turned in the direction of the arrow during the downstroke the cams $F^2$, F', and F are turned with the pinion one revolution, the spring S¹² bearing against the opposite face of the pinion N' from the pin n, serving to press the pinion against the cam and keep the pin in the slot. During the upstroke of the rack N, the pinion being turned in the opposite direction, the pin n slips backward out of the slot n' against the pressure of the spring S¹² and moves with the pinion around the face of the cam F², which remains stationary until at the end of the upstroke of the rack the pin has engaged again with the slot to move the cams, as before, on the next downstroke, and so on.

The cam F acts upon the roller in the cradle L and tends to raise and lower said cradle, which is pivoted at C⁶. The spring S between the cradle and the top of the case A serves to keep the roller L¹⁴ pressed against the cam. The cradle L and its attachments perform the various functions of presenting a fastener at the proper moment under the die P, passing it up through the leather or fabric and clinching the same through the button-eye under the die, as will be fully described hereinafter.

The buttons are introduced in quantity through the funnel-shaped attachment B² into the drum B, and the fasteners through B³ into the drum B', communication with the interior of the drums being opened or closed by means of the plates Z Z', swinging on the hubs B⁴ B⁵ and operated by the handles i i', respectively, in a manner easily understood by reference to Fig. 4. The drums B and B' contain the buckets b and b', respectively, by means of which the buttons and fasteners are raised to be dropped, the buttons upon the trough D and the fasteners upon the fastener-trough E.

The shape of the inclined trough D is such that while broad and somewhat flattened at its outer end to form a suitable receptacle for the buttons as they fall upon it, it soon narrows down into the channeled portion d⁴, which is of sufficient width to allow a single row of buttons to slide therein with their eyes down, as shown in Fig. 2. The trough is supported near its inner end by the part D³, which is soldered or otherwise secured directly or indirectly to the body of the machine.

K and K' are a pair of guide-rollers provided at equal intervals along their circumferences with the grooves k', parallel to the axes of the rollers. They are each provided also with a circumferential groove, k³, (see Fig. 13,) near the outer edge of the rollers, in which lies the button-feed wire D². This bent wire D², starting from the end of trough D, passes partially around the peripheries of the two guide-rollers K and K', as shown in Figs. 2 and 7, in such a manner as to be held perfectly stationary as the said rollers revolve; thence it passes along the raceway D', through the channeled portion D⁷ in the forwardly-projecting part of the frame, and terminates at the die P, under which the clinching of the fastener around the button-eye is accomplished.

The trough D is provided near its outer end with the spring-wire d, bent at right angles at its top and bearing against the internal ratchet-teeth, b², with which the drum B is provided. As this drum revolves in the direction of the arrow shown thereon, the wire d imparts a jarring motion to the trough D, causing the buttons, with the aid of gravity, to travel in a stream along the channeled portion d³ to the end of the trough, from which they then drop off. Many of them are in suitable position to be caught by their eyes on the upper protruding end of the wire D². Those that do not catch in this way fall back along the beveled portion A⁵ to the bottom of the drum B. The buttons are taken one at a time from the upper vertical portion of the wire D² by the grooves k' in the roller K' as they come around, and are carried along on the said wire, which passes under the roller K' and over K by the bearing of the grooves k' as the rollers revolve against the eyes of the buttons resting therein, as is clearly shown in Fig. 2, the buttons being passed from one roller to the other in a manner easily understood by reference to that figure, in which the eye of a button (the head being removed) is shown in the act of being thus transferred from one to the other. The button-heads are kept in proper position by the guides D³ and D⁴. From the guide-roller K the buttons are crowded upon the wire D² along the raceway D', as far down as the notched separator T, by which one button at a time is taken and allowed to drop down to the end of the wire D² at the proper time to be seized and carried through the required operation of fastening, as hereinafter described.

The guide-rollers K and K' are operated as follows: The roller K, having the hollow spindle k⁵, is secured to the gear-wheel K³ to turn with it. On the same hollow spindle k⁵ run loosely the gear-wheel K⁴ and the circular plate k⁴, provided with a notch, k⁸, in its periphery.

k⁹ is a spiral spring, the outer end of which, being circular, is sprung into a circular groove, k⁶, made near the outer end of the hollow spindle k⁵. This spring, pressing against the plate k⁴, tends to make the wheel K⁴, while loosely turning on the spindle k⁵, bear with considerable friction against the gear K³. The hollow spindle k⁵, with its attachments, as shown in Fig. 13, turns on the spindle C³, fixed in the casing K², secured to the frame of the machine. (See Fig. 4.) On a spindle, C⁴, similarly fixed in the casing K², turns the third gear-wheel, K⁵, and the guide-roller K', secured thereto, K⁵ and K³ meshing together.

The drum B is provided with an internal annular gear, b⁴, which works with the loosely-running gear K⁴. As long as that portion of the wire D² lying between the notched separator T and the guide-roller K is crowded with buttons the resistance causes the gear K⁴ to turn on the hollow spindle $k^5$, while the gear $K^3$, and hence the guide-rollers K K', remain stationary. As soon as one or more buttons have been removed from below by the separator T the resistance is removed and the friction of the gear $K^4$ against the gear $K^3$ causes the guide-rollers to move until the feed-wire is again crowded. In this manner there is always a store of buttons on the inclined portion of the wire $D^2$.

$F^3$ is a plate pivoted at $f$ to the case A, and having an internal cam-shaped opening. This plate $F^3$ derives an intermittent rocking motion up and down from the cradle L, as seen in Figs. 2 and 7. The upwardly-projecting part $L^3$ of the cradle is provided with a shoulder, $l^7$, which during the upward motion of the cradle bears against the pin $f'$ on the plate $F^3$, near its pivot $f$, thus moving the said plate $F^3$ upward. The downward motion of the plate is effected by the pin $L^4$, which, when the cradle descends, bears against the inner cam-shaped opening in the plate, thus bringing it down against the stop $f^2$, fixed in the frame.

The separator T is a notched disk pivoted at $t^2$ on the forward inclined portion of the frame near the channel $D^7$, in which lies the feed-wire $D^2$. A wire, $t$, (see Figs. 2 and 7,) bent at one end through a hole near the outer edge of the disk T, and at the other around the pin $f^3$ in the plate $F^3$, serves as a connecting-bar, whereby as the said plate $F^3$ moves up and down an oscillating motion is given to the disk T between the positions shown in Figs. 1 and 14 corresponding to the extreme up and down positions of the cradle L, respectively. The upper curved edge of the disk T is preferably the arc of a circle struck from the pivot $t^2$, and against this curved edge rests the lowest of the row of buttons strung on the wire $D^2$ between the guide-roller K and said disk T, when the latter is in the position shown in Figs. 1 and 6. When the disk T is in the position shown in Fig. 14, the said lowest button of the row drops into the slot $t^4$, and the disk quickly moving into the position shown in Fig. 1 the button is moved along the wire $D^2$ and drops down by gravity on the vertical part of said wire.

It will be observed that the duty of the guide-rollers K K' is twofold, being first to properly feed the buttons along the wire, and secondly to hold said wire positively in place. I may use, if desirable, more than two such rollers; but whatever the number of rollers employed, it is intended that the feed-wire will be bent for sufficient distance around their peripheries as to be held stationary as the rollers revolve without being confined elsewhere, thus providing an unobstructed pathway for the button-eye from one end of the said feed-wire to the other. The wire $D^2$ is so bent around the two said rollers that its absolute position is determined without its being held at any other point.

M M are two gripper-jaws, which seize the button, as shown in Fig. 1, by the eye, remove it from the feed-wire $D^2$ and carry it under the die P. The jaws M are swung loosely on the pin $f^5$, fixed in the plate $F^3$, one jaw on each side of the U-shaped frame M', also supported on the pin $f^5$. The spring $S^5$ presses the jaws M against the sides of the frame M'; but they are so loosely hung on the pin $f^5$ as to admit of being separated laterally at their lower end against the pressure of the spring, which, however, tends to keep them normally pressed together at the said lower end. The frame M' and jaws M are pivoted on the pin $f^5$ to swing outwardly; but the coiled spring $S^8$, pressing between the frame M' and the pin $f^4$, serves to keep the lower end of the frame and jaws pressed inward toward the machine. On the back of each leg of the U shaped frame M' is a cam-shaped projection, $m^2$, which is pressed against a stop, $m'$, fixed to the frame.

$m$ $m$ are two pins fixed in the frame M', fitting loosely in holes in the jaws M M, to serve as guides for the latter as they separate laterally.

O O are two cheeks, passing one on each side of the die P and terminating behind it in the bar O'. The bar, and with it the cheeks O, derive a reciprocating back-and-forth motion from the lever G, pivoted at $C^2$. The cam F' on the spindle C' bears against the roller G', and in connection with the spring $S^9$, which indirectly acts, as will be presently more fully explained, to keep the roller G' in contact with the cam, gives the said lever G an intermittent oscillating movement back and forth. By means of the roller $G^2$ on the back of the lever bearing against the cam-shaped under side of the bar O', acting in connection with the pin $O^3$, working in the slot $O^4$, and the spring S', an irregular reciprocating motion of the lever G is imparted to the bar O', and thence to the cheeks O, which have also a slight upward movement as they are drawn back into the machine, as will be seen by reference to Figs. 2 and 7 especially.

To understand the operation of the gripper-jaws M, start with the machine in the position shown in Fig. 7, with the cradle L, and hence the plate $F^3$ and the gripper jaws M, at their lowest position. The cheeks O are at their forward position, being preferably flush with the front face of the die while the jaws have just conveyed a button under the said die. A fastener rests on the forward end of the clinching-bar L'. The leather or cloth being introduced between the fastener and the die, the rack N is moved downward, which causes the cradle to rise, the point of the fastener being driven through the leather, which is thus pressed upward against the bottom of the jaws. This pressure is resisted by the bearing of the jaws against the beveled under side, $o^6 o^6$, of the cheeks O, the pressure upward tending, as will be seen in Fig. 14, to lock the two jaws together and strip the leather down upon the fastener. The fastener having penetrated the leather, passes through an opening between the two jaws on the under side thereof and enters the button eye still held by the jaws under the die. The fastener is then released from the clinching-bar and the cheeks O O are next withdrawn back of the die. At this point the shoulder $l^7$, coming in contact with the pin $f'$, causes the plate $F^3$ to begin its upward movement, carrying with it the jaws M, which are separated as they move upward by the rounded sides of the die P, over which they pass, thus releasing the button which now hangs on the fastener with its eye under the die. When the jaws M snap together again above the die under the influence of the spring $S^5$, they tightly close around the eye of the button resting just on top of the die, as shown in Fig. 2. At the same time that the jaws rise the cam-shaped projection $m^2$ passes above the stop $m^3$, allowing the lower end of the jaws to be pressed back slightly under the influence of the spring $S^8$. By this means the jaws close together over the eye of the button above the die, instead of pressing against the button-head. Meanwhile the cradle has completed its upward motion and clinched the fastener around the eye of the button. The action of the slotted disk T, previously explained, in separating the button from the row above and allowing it to drop along the vertical portion of the feed-wire, takes place simultaneously with the closing of the jaws M on the button above the die, as in Figs. 1 and 2.

Before the rack N has reached its lowest point the cheeks O are pressed forward, pushing the lower end of the jaws M outwardly before them. The jaws, grasping the button by the eye, cause the feed-wire $D^2$ to spring out of the notch in front of the die, so that when the cradle descends rapidly, as it now does at the end of the downward motion of the rack N, the jaws M, descending also, carry the button off the feed-wire, which springs back into the notch in the die and convey it under the said die in the position shown in Fig. 7, the jaws spring back flush with the front of the die under the action of the spring $S^8$, after having passed beneath the cheeks O. The fasteners, being dropped from the buckets $b'$ of the drum B' upon the outer flaring portion, E, of the inclined fastener-trough, travel along down the same, as shown in Fig. 10, by the jarring action of the wire $e^3$, which works with the internal ratchet-teeth, $b^3$, in a similar manner to the wire $d$ on the button-trough.
The peculiar shape and tilted position of the fastener-trough (clearly shown by the section in Fig. 5) cause most of the fasteners, falling on the upper portion of the part E in an upright position to travel regularly down the same into the raceway $e\,e'$.

Fig. 11 shows a cross-section of the raceway on a larger scale, and also shows clearly the peculiar shape of the metallic fastener used in this machine. The curved fastener-raceway is made up of the strip $e^3$, which is attached to or cast with the part $A^3$ of the frame of the machine. On this are screwed the curved strips $e\,e'$, separated by pieces $e^2\,e^2$, allowing a suitably-shaped channel for the fastener, which is confined therein by its head. The strip $e'$, passing through the aperture in the part $A^3$ of the frame, terminates in the point $e^8$ which is so situated as to cause those fasteners which are not in proper position for passing into the raceway $e\,e'$ to drop back into the drum.

U is an oscillating arm pivoted at $C^7$ to the case $A'$, and which rocks back and forth under the fastener-raceway, as shown in Fig. 3. The rocking motion of the arm U is brought about by the part $a$ of the cam $F^2$ acting alternately upon the projecting portion $u^6$ and upon the bent lever $W^2$, pivoted at $w'$ to the casing $A'$.

$w^3$ is a pin fixed in the back of the arm U, so as to engage in a notch in the upper end of the lever $W^2$. The part $a$ of the cam $F^2$ first strikes the projecting end $u^6$ of the rocking arm, causing the upper end of said arm to move forward to the position indicated by the dotted lines in Fig. 3. Then $a$ passes by $u^6$ and strikes against the rear end of the lever $W^2$, thereby rocking the arm U back to the original position. The motion of the arm back and forth is limited by the slot $u^3$ working over the pin $w'$. The upper end of the arm U is bifurcated, as shown in Figs. 16 and 17, and contains the strip $u$, the shape of which is best shown in Fig. 3, pivoted to the arm at $u'$. The rear lower portion of the strip projecting beyond the arm is pressed against the same by the spring $u^3$. Into the bifurcated portion of the arm U projects the lower end of the curved plate $e$ of the fastener-raceway and bears against the curved upper edge of the strip $u$. The forward upper edge of the arm U is cut away to form a shoulder, $u^4$, and the forward end of the strip $u$ terminates in the tongue $u^2$, which, when the arm is in the backward position, is pressed up on a level with the top of the shoulder $u^4$ by the action of the spring $u^3$. In this position the space between the shoulder and the tongue is immediately under the row of fasteners in the raceway $e\,e'$, which is constantly full of fasteners. The upper curve of the strip $u$ is such that when the arm is moved to its forward position the said strip is pressed downward by the bearing of the under edge of the plate $e$ against the said curved upper edge, and the tongue $u^2$ is depressed against the action of the spring $u^3$, as shown in dotted lines, representing the forward position of the arm in Fig. 3. Each time the rocking arm U moves forward it conveys a fastener from the raceway to the hinged fastener-carrier $h$, (see especially Figs. 2, 7, 16, and 17,) by which it is transferred to the top of the clinching-bar $L'$.

The hinged fastener-carrier, pivoted at $h^4$ to the rod $H'$, which is rigidly secured to the case A, consists of the side piece, $h$, the semi-cylindrical part H, the portion $h'$, on which rests the head of the fastener, and the grooved block $h^2$, secured to the plate $h^5$ and hinged at $h^3$ to the side $h$. A spring, $S^6$, bearing between the semi-cylindrical part H and the plate $h^5$, tends to keep the block $h^2$ pressed lightly downward against a suitable stop. The cradle L is provided with the upwardly-projecting portion $L^5$, Fig. 8, which has a shoulder, $l^2$. The front surface of $L^5$ above the shoulder bears against the flat face of the semi-cylindrical portion H of the fastener-carrier when the cradle is down. The light spiral spring $s^7$ is secured at one end to the casing A, and, passing partly around the cylindrical portion $h^7$ from behind and below, is attached at the other end to the part H.

When the cradle is up, as in Figs. 2 and 17, the hinged carrier is down, for then the shoulder $l^2$ on the upwardly-projecting part of the cradle having passed above the semi-cylindrical portion H the tension of the spiral spring $s^7$ turns the carrier down at right angles to its former position, with the flat face of H horizontal beneath the shoulder $l^2$. When, on the other hand, the cradle moves down to the position shown in Figs. 7 and 16, the shoulder $l^2$, bearing against the edge of the flat face of H, acts as a tooth and turns the carrier up, with the said flat face vertical against the face of $L^5$.

To avoid unnecessary complication both in Figs. 16 and 17, several parts of the mechanism have not been drawn in that would really appear, all parts, with the exception of those necessary to rhow the action between the rocking arms hinged carrier, and clinching-bar, being broken away or left out altogether. The fastener being held in the space between the shoulder $u^4$ and the tongue $u^2$ on the rocker-arm U, the arm moves forward, the tongue $u^2$ is pressed down, as previously explained, and the hinged carrier being up the fastener is pressed into it, as shown in Fig. 16, the head of the fastener bearing against the part $h'$, while the point is pushed into the groove in $h^2$, the fastener being held by the spring-pressure of $h^2$. The rocker-arm then quickly moves back. This takes place at the beginning of the downward stroke of the rack N, the cradle being down. The cradle then moves up, and the hinged carrier moving down, the part $h'$ meets the upper surface of the clinching-bar L' just back of the shoulder $l^{11}$, the upper surface of $h'$, containing the fastener-head, being on a level with the top of the clinching-bar L' in front of the shoulder $l^{11}$, and the fastener being of course in an upright position, as best shown in Fig. 2.

The removing of the fastener from the hinged carrier and its final conveyance to the front of the clinching-bar L' is effected by the sliding carrier R R'. (Shown in place on the clinching-bar in Fig. 8 and by itself in Fig. 9.) This carrier is made, preferably, from strips of thin metal bent to form the two guides R R', which are fixed one on each side of the block $R^2$. The horizontal portions $r$ $r'$ of these pieces are adapted to fit easily the grooves $l$ on each side of the clinching-bar L', in which the carrier slides back and forth.

Near the upper end of the oscillating lever G is the pin $G^3$, which works in the slot $R^4$ in the block $R^2$. As the lever oscillates back and forth by the action of the cam F', as previously explained, it causes the sliding carrier R R' to move back and forth along the clinching-bar. $R^3$ is a bar projecting forward from the block $R^2$ and forked at its forward end, $r^3$. The two strips R R' are bent at their forward end to form spring-jaws $R^5$ $R^6$ over the top of the clinching-bar.

When the hinged carrier has brought the fastener down into the position shown in Figs. 2 and 17, the sliding carrier R R' is at the back of its stroke. It immediately begins to move forward, however, and the fork $r^3$ of the bar $R^3$ seizing the fastener removes it from the hinged carrier, sliding it along under the spring-block $L^6$. The object of this latter device is to turn the fastener in the proper position for clinching. The fastener being of irregular shape, it is necessary that it be presented under the die in one position—viz., with its upwardly-curved neck pointed toward the rear. It is more than likely that most of the fasteners will have been turned in that position by the action of the rocker-arm in depositing them on the hinged-carrier, but to turn those that are not in the right position the block $L^6$ is used.

In Fig. 2 a portion of the casting is broken away to show the action of the block, which is pressed down upon the stops $l^3$ $l^3$ by the springs $s^3$ $s^3$. The pressure of the block against the top of the fastener, while the latter is being pushed along under it by the forked-bar $R^3$, causes the fastener to be turned in the proper position, if it has not previously been so turned, and the fastener is left by the forked bar with its point in the retaining-groove $l^5$, near the forward end of the block $L^6$. To aid in the turning process, the under side of the spring-block is preferably beveled out slightly, as at $l^4$.

Just after the fastener has been removed from the hinged carrier the cradle begins its swift descent near the end of the downstroke of the rack N. and at the same time the hinged carrier quickly springs up to receive another fastener at the beginning of the next downstroke.

The sliding carrier R R', having left the fastener under the spring-block $L^6$, moves backward, and the jaws $R^5$ $R^6$ at the forward end of the carrier, coming in contact with the fastener, spring apart, allowing the fastener to enter and be held in the notch $r^2$, the fastener being prevented from moving backward by reason of the shoulder in the retaining-groove $l^5$. While the cradle is dropping down the sliding-carrier R R' again moves forward, carrying the fastener held between the jaws $R^5$ $R^6$ to the front of the bar L' and under the die P, and at the same time the forked bar $R^3$ moves forward another fastener from the hinged carrier to the forward end of the spring-block $L^6$. The sliding carrier R R' remains at its extreme forward position until the cradle L has risen sufficiently to push the point of the fastener through the leather and into the eye of the button held in the jaws M, when it quickly moves backward, the jaws R⁵ R⁶ springing apart and leaving the fastener. The clinching of the fastener is then completed, as was previously explained. It will be observed that the leather does not press directly against the die during the operation of clinching, but is separated therefrom by the spring-jaws M, against the smooth under surface of which the leather is pressed while being stripped down onto the fastener as it rises.

All the operations are performed during the downstroke of the rack N. The motions of the cradle L and of the sliding fastener-carrier R R' are variable, as will be seen by the irregularity of the cams F and F'.

When the machine is at rest, the cradle and the jaws are down and the hinged carrier up.

To trace the operations in their order, the very first operation at the beginning of the downstroke of the rack N is the quick motion of the rocking arm U back and forth to place the fastener in the hinged carrier. The hinged carrier then moves down as the cradle quickly rises until the point of the fastener penetrates the leather and the button-eye, when the cradle stops for a moment, and at this point the sliding carrier R R' is drawn back. Then the cradle slowly rises with gradually-retarded speed through the small distance necessary to clinch the fastener, and simultaneously therewith the jaws M release the button under the die and separate as they quickly rise over the die, closing together over the eye of a button above it. At the same time that this motion takes place the slotted disk T turns on its pivot, separating a button from the row above it on the feed-wire and allowing it to drop down the vertical portion of the wire. Finally, just before the end of the downstroke of the rack the cradle drops down to its lowest position, and at the same time the sliding carrier moves forward, bringing a new fastener to the front, the hinged carrier springs up, the cheeks O O move forward, the jaws M strip the button off the feed-wire and carry it under the die, and the separating-disk returns to its former position with its slot inclined upward. All operations then cease during the upstroke of the rack, to be repeated, as before, on the next downstroke.

The clinching-bar L' is not rigidly attached to the cradle, but is cushioned therein, as represented in Fig. 2, the cradle being there shown partly in section, so as to make clear its interior construction. The pivot C⁶, on which the cradle rocks, passes tightly through the same to turn with it, but allows the bar L' to turn loosely thereon, while the pivot itself turns easily in its seat on either side of the machine. Near the rear of the bar L' are the stiff springs S⁴ S⁴ S⁴, between it and a second bar, L², which bears at its upper forward end against the bar L' and rests on the pin $l^{10}$, fixed in the cradle. The bar L' has a short slot which works on the pin $l^9$, also fixed to the cradle, thereby enabling the bar L to play up and down to a slight extent independently of the cradle. The downward pressure on the outer end of the clinching-bar, due to the clinching of the fastener, is thus transmitted through the cushioned compound levers L' L², the result being that the machine is thereby adapted to secure buttons to leather of varying thickness, and at the same time the cushioning compensates for the wear of the working parts.

It has been found best in practice to bevel the extreme forward end of the clinching-bar L, forming thus an inclined seat, $l^{16}$, for the fastener. This beveled seat causes the fastener to incline forward slightly to the line of motion, and thereby aids effectually in the clinching of the fastener around the button-eye.

The particular form of machine herein described and illustrated is intended, as was said before, to be secured to the top of an ordinary pedestal, in which an upright rod is given a reciprocating up-and-down motion by means of a treadle working against a spring, the said rack being secured to the upright rod. It will be seen, moreover, that during the earlier part of the stroke the least practical work is being done by the machine, while near the end of the stroke, when the foot has nearly reached the bottom, the clinching of the fastener takes place. Furthermore, if the spring S⁹ were to act directly upon the lever G to keep the roller G' against the cam F', the force required in pressing down the treadle near the end of the stroke would be enormously increased by reason of the fact that in addition to the hard work of clinching the fastener much force would have to be expended on the treadle in moving it against the resistance of the spring S⁹, which is then pulling its hardest in the opposite direction. To equalize to some extent the work done by increasing it at the early part of the stroke and diminishing it at the end, and hence insuring a more uniform motion of the rack N, I have introduced the triangular plate F⁴, Figs. 2 and 7, which is pivoted at $g'$ to the case A. The connecting-bar G⁴ is pivoted at one end to the lever G and at the other to the face of the plate F⁴. On the back of the said plate F⁴ a bar, $g^1$, is pivoted at one end, $g^2$, to the plate, and at the other end, $g^3$, is attached to the spring S⁹, the pivotal points being in such relation to each other that when in the earlier part of the stroke the cam F' begins to move the lever G to the right the resistance of the spring S⁹, which would, if directly connected to the said lever, be comparatively light at first, gradually increasing as the spring became more deflected, in this case acts in just the reverse manner, being greatest at first and gradually diminishing. The reason of this is that when the said lever G begins its motion to the right, as in Fig. 7, a little movement on the part of the lever causes the end of the spring to move through many times the same distance, whereas near the end of the movement of the lever, as in Fig. 2, though the spring is then in reality pulling its hardest, yet the lever must move through considerable distance to deflect the spring even a little; hence the actual work done is more evenly distributed throughout the stroke.

The spindle C is prevented from turning, except in the direction of the arrow, by means of the detents $d$ and $e$, which serve also, as has been said, to give the jarring motion to the button and fastener troughs.

I claim—

1. In a button-setting machine, the combination, with an inclined vibrating fastener trough and raceway, of a rocking arm, U, provided with a spring-tongue, $u^2$, a hinged fastener-carrier, $h$ $h'$, a pivoted clinching-bar, L', and a reciprocating forked fastener-carrier, $R^3$, all constructed, arranged, and operated substantially as and for the purposes herein described.

2. In a button-setting machine, the combination, with a fastener-raceway, of a rocking arm, U, provided with a tongued strip, $u$, pivoted therein, and a hinged carrier consisting of a frame, $h$ $h'$, swinging on the pivot $h^4$, and provided with a fastener-holding spring-block, $h^2$, whereby the fastener, when removed from the raceway by the said rocking arm and transferred to the hinged carrier, is held therein between the block $h^2$ and the part $h'$, all of said parts being arranged and operated substantially as and for the purposes described.

3. A button-feeding device consisting of the combination of a trough, peripherally-grooved guide-rollers provided with one or more radial recesses, a stationary feed-wire partially embracing said rollers, whereby the said wire is held, and suitable guides, whereby the button-heads are held in proper position, all arranged and operated substantially as herein described.

4. In a button-setting machine, the combination of two or more revolving grooved and recessed button-guiding rollers with a button-feeding wire partially embracing said rollers, whereby the said wire is held stationary with its ends free, substantially as and for the purposes herein described.

5. A button-feed consisting of a stationary wire bent around one or more revolving guide-rollers, each provided with a circumferential groove, $k^3$, and transverse grooves $k'$, substantially as described.

6. The combination, with a button-feed wire, of the pair of spring gripper-jaws M M, the reciprocating cheeks O O, and the clinching-die P, all arranged and operated substantially as described.

7. The combination, with the button-feeding wire $D^2$, of a pair of reciprocating spring gripper-jaws, M, and the clinching-die P, whereby the said jaws strip the button from the wire and carry it under the die, substantially as and for the purposes herein described.

8. In a button-setting machine, the combination, with a clinching-bar, of reciprocating spring-jaws M and cheeks O, having beveled under sides $o^6$, whereby when the fastener is pressed through the leather or fabric between the said clinching-bar and the ends of the jaws the latter are locked together, substantially as and for the purposes described.

9. In a button-setting machine, the combination, with a clinching-bar, L', of a fastener-retaining spring-seated block, $L^6$, having a shouldered groove on its under side, and a reciprocating carrier sliding on said clinching-bar and provided with spring fastener-holding jaws $R^5$ $R^6$, constructed, arranged, and operated substantially as and for the purposes herein described.

10. In a button-setting machine, the combination, with a hinged fastener-carrier, $h$ $h'$, of a clinching-bar, L', a spring-block, $L^6$, provided with a fastener-retaining shouldered groove, $l^5$, and a reciprocating carrier sliding on said clinching-bar provided with a forked bar, $R^3$, and spring fastener-holding jaws $R^5$ $R^6$, substantially as herein described.

11. The combination, with a bar, L', of a fastener-turning spring-block, $L^6$, provided with the beveled under side $l^4$, and a reciprocating bar, $R^3$, substantially as described.

12. A button-feeding device consisting of the combination of the feed-wire $D^2$, revolving grooved and recessed button-guiding rollers K K', and a notched vibrating button-separator, T, substantially as herein described.

13. In a button-setting machine, a cradle, L, pivoted at $C^6$ to the frame of the machine and provided with the pins $l^9$ $l^{10}$, in combination with the slotted clinching-bar L', the supporting-bar $L^2$, and the cushioning-springs $S^4$, substantially as and for the purposes described.

14. In a button-setting machine, the combination, with a reciprocating rack, N, of a loose pinion, N', meshing therewith and provided with the pin $n$, the connected cams F, F', and $F^2$, one of which is provided with the slot $n'$, whereby the said cams are turned at each downstroke of said rack, the pivoted spring-cradle L, and the oscillating spring-lever G, whereby motion is transmitted from the said cams to the various parts of the mechanism, substantially as described.

15. A button-setting machine consisting of the combination of revolving feeding-drums, button and fastener conducting troughs and raceways, a stationary button-feeding wire mechanism, button and fastener separating devices, a clinching-die, button-delivery jaws, a clinching-bar, and a sliding reciprocating fastener-carrier, all arranged and operated substantially as and for the purposes described.

16. In a button-setting machine, a movable clinching-bar, L', provided with reciprocating fastener-holding spring-jaws $R^5$ $R^6$ sliding thereon, substantially as herein described.

17. In a button-setting machine, a clinching-die, P, in combination with button-carrying reciprocating jaws M, which grasp the button by its eye, whereby one button at a time is carried automatically under said die, substantially as herein described.

18. In a button-setting machine, the combination, with a button-feed wire, $D^2$, of a pair of reciprocating button-carrying spring gripper-jaws, M, whereby the button is stripped from the wire, substantially as herein described.

19. In a button-setting machine, the combination of the clinching-bar L' and the stationary die P and a pair of reciprocating spring gripper-jaws, M, whereby the leather is stripped down over the fastener and kept free from the die, substantially as herein described.

20. In a button-setting machine, a movable clinching-bar, L', provided with a beveled seat, $l^{16}$, whereby the fastener is inclined in the line of motion during the operation of clinching, substantially as herein described.

In witness whereof I have hereunto set my hand.

ANALDO M. ENGLISH.

Witnesses:
WM. B. H. DOWSE,
ALBERT E. LEACH.